Sept. 19, 1933.  J. W. COSGROVE  1,927,024
COATING MACHINE
Filed Jan. 25, 1929   2 Sheets-Sheet 1
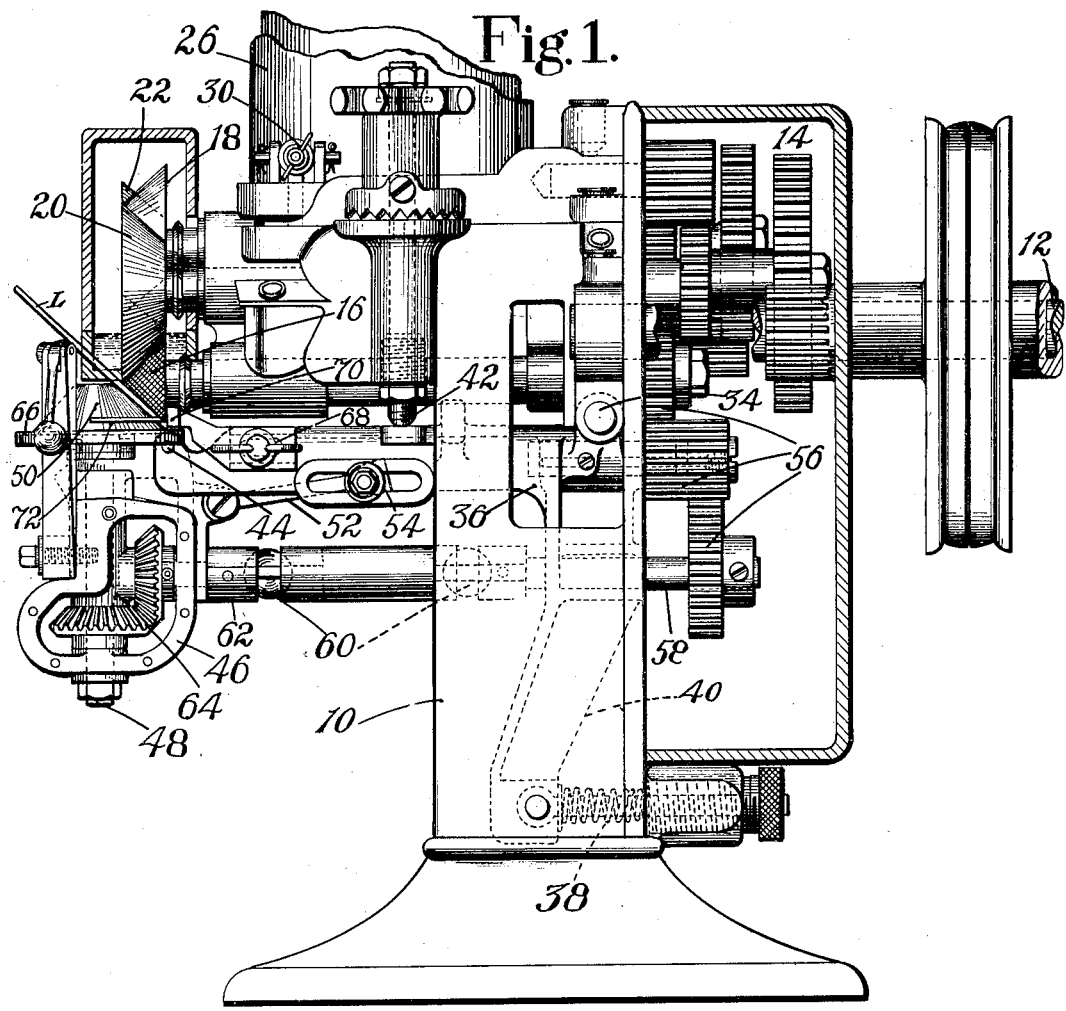
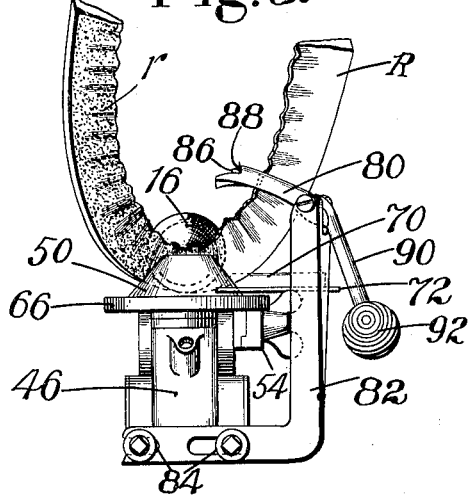
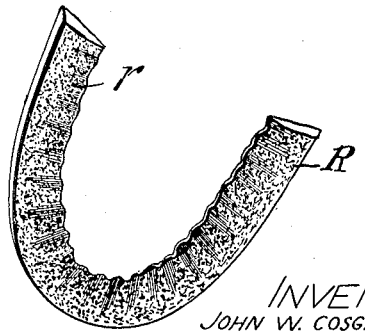
INVENTOR
JOHN W. COSGROVE, DEC'D.
CAROLINE E. COSGROVE, ADMX.
BY HER ATTORNEY.
Victor Cobb Sept. 19, 1933.　　　J. W. COSGROVE　　　1,927,024
COATING MACHINE
Filed Jan. 25, 1929　　2 Sheets-Sheet 2
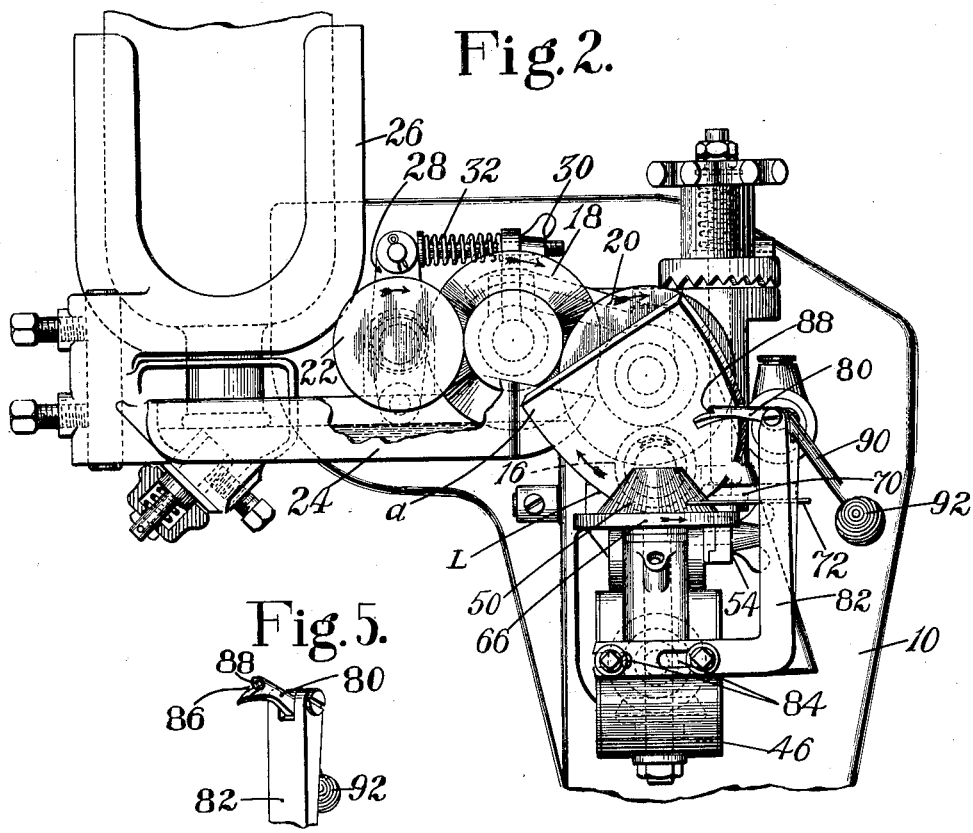
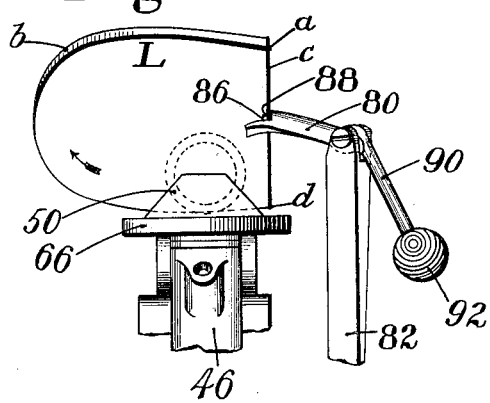
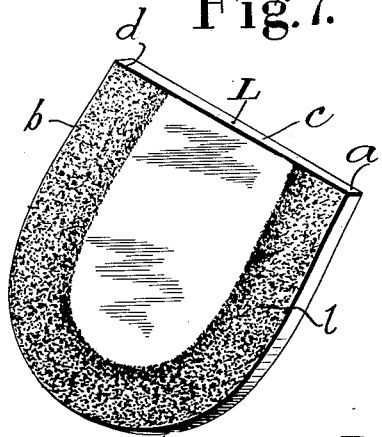
INVENTOR
JOHN W. COSGROVE, DEC'D.
CAROLINE E. COSGROVE, ADMX.
BY HER ATTORNEY.
Victor Cobb Patented Sept. 19, 1933

1,927,024

UNITED STATES PATENT OFFICE 1,927,024

COATING MACHINE

John W. Cosgrove, deceased, late of Medford, Mass., by Caroline E. Cosgrove, administratrix, Medford, Mass., assignor to United Shoe Machinery Corporation, Paterson, N. J., a corporation of New Jersey Application January 25, 1929. Serial No. 335,015

38 Claims. (Cl. 91—50)

This invention relates to heels and to machines by which a coating, as of latex or other cement, may be applied to work, the machines being well adapted for cementing the curved edges of heel-portions of shoes, such as lifts and rands.

The invention has as an object the provision of a machine by which a marginal area of substantially uniform width at the edge of a work-portion may be coated, and the coated piece ejected from the machine, without requiring attention on the part of the operator other than to introduce it.

In the attainment of this object, the invention includes as a feature co-operating rotatable work-engaging rolls, each of which has an operating surface inclined with respect to its axis of rotation, and a gage, positioned at the faster moving end of one roll, toward which the rolls tend to force the work, together with means for supplying a coating substance for application to said work. The inclination of the rolls and their consequent rotation over different portions at different peripheral speeds is utilized to maintain the desired contact between the work and gage, with a resulting uniformity as to the width coated. Especially is this relation useful when the work is curved, as about the edges of heel-lifts and the like, when the effect of the differential speed is to turn the work through the proper path, while maintaining it in contact with the gage. Preferably, there are employed co-operating conical rolls, one of which applies the coating and the other of which supports the work to press it against the applying roll, the rolls being arranged with their axes diverging from the bases. The gage is shown as situated adjacent to the bases of these conical rolls, and may comprise a substantially horizontal table-portion and a substantially vertical portion, these being best mounted for adjustment together toward and from the rolls. A yieldable mounting for one of the rolls is shown, permitting the apparatus to receive work of varying thickness. There is also furnished means for adjusting the inclination of an operating surface, as upon a part carried by the yieldable mounting, enabling it to contact with the full width of the area to be coated, whatever the angle at which the latter may lie.

Another feature of the invention concerns the delivery of the work from the apparatus. For this purpose, an ejecting member is arranged to contact with the work as it is advanced by the rolls or other engaging members. This prevents the retention of the work within the machine after the area to be coated has been once operated upon. By mounting this ejecting member to yield under the influence of the work as it is introduced between the engaging members, interference with the feeding or initial work-movement is avoided. The ejecting member herein appears as a finger pivoted adjacent to the rolls and having, at one extremity, a recess which receives the work to check its continued travel, and at the other extremity a weight to allow the finger to yield under the influence of the entering work.

The invention is illustrated in the accompanying drawings. In these,

Fig. 1 shows the improved machine in front elevation, parts being broken away;

Fig. 2 is a side elevation looking from the left in Fig. 1;

Fig. 3 is a detail in side elevation of the work-engaging rolls and ejecting finger in connection with which appears a work-piece differing in character from that shown in Fig. 2;

Fig. 4 is a perspective view of the work-piece of Fig. 3;

Fig. 5 shows in perspective the ejecting finger and a portion of its mounting;

Fig. 6 is a view similar to Fig. 3, but with the work-piece operated upon the same as in Fig. 2; and Fig. 7 is a perspective view of this work-piece.

The general machine structure, modified to give the organization of the present invention, may be that disclosed in Letters Patent of the United States No. 1,851,162, granted Mar. 29, 1932, upon an application filed in the name of John W. Cosgrove, deceased. In this earlier apparatus, a frame 10 has journaled in it a driving shaft 12, which, through gearing shown at 14, rotates about horizontal axes in the direction indicated by the arrows in Fig. 2, a cement-applying roll 16, a cement-supplying roll 18, an intermediate roll 20 delivering cement from the supplying to the applying roll, and a stripping roll 22 acting upon the supplying roll. This supplying roll 18 takes its cement from a trough or receptacle 24, which is fed barometrically from a container mounted in a holder 26. Cement is thus raised from the receptacle by the roll 18, and is delivered under the control, as to quantity, of the roll 22 upon the intermediate roll 20, by which it is transferred to the applying roll 16. Since all the rolls of this chain rotate in the same direction, there is no churning of the adhesive between them, which action has such a tendency to coagulate latex. Instead, the adhesive is successively deposited by each roll upon that in advance of it, and any excess upon the applying roll 16 is delivered by its upgoing side to the preceding roll 20, to be returned thereby to the roll 18 and thence to the receptacle 24. The space between the stripping roll 22 and the supplying roll 18, and therefore the quantity of the adhesive which the latter roll may convey to the roll 20, may be varied by adjusting the roll 22. For this purpose, it is mounted in movable bearings 28, and may be drawn toward the roll 18 by a threaded rod and nut 30, a spring 32 exerting its force to hold the stripping roll away from the applying roll. Each of the rolls 16, 20, 18 and 22 is conical, thus differing from the rolls of the previously mentioned application, the present rolls being either cones of full length, as is the roll 16, or frusta of cones, the rolls 20, 18 and 22 being thus shown. Their inclination is such that they preferably contact with the adjacent rolls across substantially their full widths, the applying roll 16 and the supplying roll 18 being arranged each with its base inward, and the companion rolls having their bases oppositely disposed in alternation, so that throughout the series the bases may lie in parallel and vertical planes. Pivoted at 34, in a plane lower than that of the axis of the roll 16, is a mounting member, in the form of an arm 36 extending substantially horizontally. A spring 38, acting upon a depending portion 40 of the arm 36, urges the latter normally upward against an adjusting screw 42, arranged to turn in the frame, and permits yield as the work varies in thickness. Pivoted upon the arm by a pin 44, between bifurcated end-portions of the arm 36, is a bearing member 46. In this bearing member 46 is journaled a substantially vertical shaft 48 having fast upon its upper extremity a frusto-conical roll 50, the inclination of which is such that the element of its surface adjacent to the applying roll 16 is approximately parallel to the corresponding element thereof. The base of this roll 50 lies in a substantially horizontal plane, the axes of the rolls 16 and 50 diverging inwardly from each other. The angular relation between the applying roll 16 and its companion, which serves to support the work and force it into coating engagement with the applying roll, may be altered by adjusting the bearing member 46 about its pivot 44 by a link 52 joined to the arm 36 by a slot-and-screw connection 54. To assist in advancing the work, the shaft 48 may be rotated from the shaft of the applying roll 16, so that the work-supporting surface of the roll 50 travels at the same peripheral speed as the registering portions of the roll 16, by a chain of elements including gearing 56, a shaft 58 journaled in the arm-portion 40, universal connections 60, a shaft 62 turning in the bearing member 46, and bevel-gearing 64 housed within a hollow portion of the member 46. About the base of the roll 50 is a flange 66, this extending beyond the pivot 44 and the gearing 64, and serving to deflect cement which may fall upon the roll 50 away from these members.

Adjustable by a slot-and-screw connection 68 upon the arm 36 is an edge-gage 70. This presents to the work a vertical wall, situated near the base of the applying roll, which guides said work in its entrance between the applying and work-supporting rolls. Extending horizontally from the gage-surface is a table-portion 72, along the surface of the work-supporting roll and adjacent to its base, across which the work-piece may be directed toward the bite of the rolls. Preferably, the vertical position of this table is such that its upper surface comes somewhat above the intersection of the bases of the rolls 16 and 50. Therefore, after the work-pieces have been entered between these rolls, their inner edges leave the vertical surface of the gage 70, and are positioned by the table. This holds the edges away from the bases of the rolls, it being of special utility when the work has a thin margin, as is the case with lift-shape pieces gouged from heels or heel-lifts. These reduced edges, if they contact with a gaging surface at the bases of the rolls, tend to work between the gage and one of the bases and thus leave an uncemented width upon the outer portion of the margin.

In operating upon such a piece as a rand R (Figs. 3 and 4), the roll 50 is so adjusted, by moving the bearing member 46 about its pivot 44 and securing it by the connection 54, that, when this roll has been separated from the applying roll by the presence of the work between them, the adjacent surfaces of the rolls will be substantially parallel to the work-surfaces with which they contact. The operator introduces one end of each rand between the rolls, the supporting roll 50, under the influence of the spring 38, forcing the upper surface of the work against the roll 16, which is supplied with cement from the receptacle 24 through the rolls 18 and 20, thereby applying a coating. Since work of this character, at its thin inner edge, is frequently corrugated, a machine such as the present is able to accurately follow this irregular surface, because the reduced portions of the rolls at or adjacent to the apices co-operate with the corrugated portions, being adapted to enter these. As already pointed out, the piece is guided in its entrance between the rolls by the gage 70, and then, as it advances, by the gage-table 72, these elements having been positioned together by the adjustment at 68 to give the proper width of coating upon the pieces operated on. Different parts of the surfaces of these conical rolls, increasing in diameter from their apices toward their bases, will move at different speeds increasing as said bases are approached. Consequently, the outer edge of a curved work-piece will be fed forward more rapidly by the rolls than will the inner edge, and will therefore be automatically turned through a curved path. When the length of the work-contacting portions of the cones between the apices and bases is greater than the radii of curvature of the work-piece, this difference in speed of rotation of the surfaces will tend to force the work outward. On the other hand, when the distances between the apices and bases are less than the radii of curvature of the work, the opposite effect will be produced, said work being urged into contact with the gaging surface during its advance. This latter condition is illustrated herein and is the one preferred, since it relieves the workman of the necessity of holding the material operated upon against the gage after he has once started it between the rolls. When the opposite end of the rand from that introduced reaches the bite of the rolls, it is released by these and drops from the machine into a receptacle or upon a conveyor.

When the work has an unbroken edge, as the heel-lift L illustrated in Figs. 2, 6 and 7, there being no space between the ends, as in the case of the rand, it tends to continue in its travel between the rolls, shifting from the curved peripheral portion of the breast-portion c (see Fig.

7), and then again to the curved portion, this continuing to coat the margin a plurality of times. To avoid this, the machine includes ejecting means, which frees the work from the rolls after one passage of the curved margin therebetween. There is illustrated for this purpose a finger 80 pivoted upon a standard 82 adjustable on the member 46 toward and from the work-engaging rolls 16 and 50 by slot-and-screw connections 84. The finger extends from the adjacent side of the rolls, or that from which the work is advanced, inwardly to a point above the inclined surface of the roll 50, this forward extremity being recessed at 86 to form a shoulder 88, which is inclined from the outer side downwardly and rearwardly, as is best shown in Fig. 5 of the drawings. At the rear of the finger is a depending portion 90 carrying at its lower extremity a weight 92, which balances it in the relation illustrated in Fig. 3. The end of the finger projects normally into the plane of the path of feeding movement and is engaged by the work, thereby setting up, in combination with the feed rolls, a rotative action which throws the work out of the machine. When the operator introduces a lift between the rolls 16 and 50 by entering the juncture $a$ of the curved periphery $b$ and breast $c$, the finger 80, which may be in its path, will yield downwardly and thus avoid interference both with the feed and with the initial travel of the work under the influence of the rolls. These rolls, having been initially adjusted as to spacing and angular relation, advance the lift and simultaneously hold it against the gage-table 72 (Fig. 2), applying a uniform coating $l$ about the curved margin of one flat face. As the opposite corner $d$ of the breast approaches the rolls (Fig. 6), the breast-edge $c$ enters the recess 86 of the finger and strikes the shoulder 88. This holds the corner $a$ of the lift against back toward the operator until the corner $d$ has left the rolls, whereupon the workpiece is free to fall from the machine. There is thus produced a desirable heel lift having on one face a latex coating $l$ limited to the margin adjacent to the curved periphery. As illustrated, the stripe extends inwardly only as far as the inner edge of the rand will extend when a rand is combined with the lift to produce a heel base such as is employed in connection with rubber heels. The surface of the lift which is given this marginal stripe of cement $l$ is the attaching surface and after it has been combined with a rand, no cement is visible in the completed base, and hence the base will have an improved appearance and there will be less danger that the operator's fingers will become soiled.

Having described the invention, what is claimed as new and desired to secure by Letters Patent of the United States is:—

1. In a coating machine, co-operating rotatable work-engaging and feeding rolls each of which has an operating surface inclined with respect to its axis of rotation whereby one end portion of each roll moves faster than the other end, a gage positioned at the faster moving end of one roll toward which the rolls tend to force the work laterally of the direction of feed, and means for delivering a coating substance for application to the work.

2. In a coating machine, rotatable conical work-engaging rolls free at the slower moving ends to receive work between them and advance it for coating, said rolls exerting a force tending to move the work laterally inwardly of the rolls, and a gage situated at the side of the rolls toward which side such lateral force acts.

3. In a machine for coating curved work, rotatable conical work-engaging rolls the small ends of which are open to receive work having a curved outline between them and advance it for coating and to exert a force tending to move said work laterally of the rolls toward the bases thereof to hold the work in engagement with the rolls, the length of the conical surfaces between the apices and bases being less than the radii of curvature of the work, and means for delivering a coating substance to a roll.

4. In a machine for coating curved work, rotatable conical work-engaging rolls arranged with the bases of the rolls adjacent and to receive work between them and advance it for coating and to exert a force tending to move said work laterally of the rolls, the length of the conical surfaces between the apices and bases being less than the radii of curvature of the work, and means for delivering a coating substance to a roll, and a gage situated adjacent to the bite of the rolls at the bases thereof.

5. In a coating machine, a substantially horizontal shaft, a substantially conical coating roll mounted upon the end of said shaft, the smaller end of said roll being directed outwardly, means for supplying coating material to said roll, a co-operating frusto-conical roll the axis of which is at an angle to the axis of the coating roll, said co-operating roll having its larger end adjacent to the larger end of the first roll and its smaller end directed outwardly whereby a piece of work may be presented between the unobstructed smaller ends of said rolls, yieldable means urging one of said rolls into engagement with the work, means for driving at least one of said rolls to cause them to feed and coat the margin of a piece of work, and a gage positioned adjacent to the larger ends of said rolls to receive the lateral thrust exerted upon each piece of work by reason of the greater speed applied to the outer margin of the work as compared with the inner portion thereof.

6. In a coating machine, co-operating rotatable work-engaging rolls one of which has an operating surface inclined with respect to its axis of rotation, said rolls being so relatively positioned that they coact to feed a piece of work and operate to exert a force tending to move said work laterally of said feeding movement, a gage having substantially vertical and horizontal gaging surfaces co-operating with the rolls and opposing said lateral movement, and means for delivering a coating substance for application to the work.

7. In a coating machine, co-operating driven conical work-engaging rolls having their bases adjacent one another, a support for one of said rolls, a table and gage mounted on said support for adjustment together toward and from the adjacent bases of the rolls to which it guides a piece of work, and means for delivering a coating substance to one roll for application to the work.

8. In a coating machine, co-operating rotatable work-engaging rolls one of which has an operating surface inclined with respect to its axis of rotation, means arranged to adjust the degree of inclination of the operating surface with respect to the axis of the cooperating roll, and means for delivering a coating substance for application to the work.

9. In a coating machine, cooperating rotatable work-engaging rolls arranged to grip a piece of work, a yieldable mounting in which one of said rolls rotates, and means arranged to adjust the angular position of the axis of the latter roll with respect to its mounting thereby to vary its cooperative work gripping relation to the other roll.

10. In a coating machine, co-operating rotatable work-engaging rolls one of which has an operating surface inclined with respect to its axis of rotation, a yieldable mounting for one of the rolls, a gage adjacent to the larger end of the roll having the inclined surface toward which the rolls may force the work, and means for delivering a coating substance for application to the work.

11. In a coating machine, co-operating rotatable work-engaging rolls one of which has an operating surface inclined with respect to its axis of rotation, a yieldable mounting in which one of the rolls is rotatable, means including a pivotal support and a screw arranged to adjust the angle of inclination of the latter roll with respect to its mounting, and means for delivering a coating substance for application to the work.

12. In a coating machine, a coating roll, a pivoted arm, a bearing member pivoted upon the arm and adjustable to different inclinations to said arm, means arranged to fix the bearing member in different positions upon the arm, and a work-engaging roll journaled in the bearing member upon an axis different from the axis of the pivot for the bearing member, said roll holding the work against the coating roll.

13. In a coating machine, means for coating the upper side of a piece of work, a work supporting roll, a movable bearing member carrying said roll on an upright axis and above the bearing member, means arranged to fix the bearing member to hold the supporting roll axis at different inclinations with respect to the work, and fluid coating-deflecting means carried by the roll and extending over the bearing member.

14. In a coating machine, a work-engaging roll rotatable about a substantially horizontal axis, a pivoted arm extending horizontally beneath the roll-axis, a work-engaging roll rotatable upon the arm about a substantially vertical axis, said axes being located in a single plane and said rolls being arranged to co-operate to grip a piece of work, and means for supplying a coating substance to the work.

15. In a coating machine, a work-engaging roll rotatable about a substantially horizontal axis, a pivoted arm extending horizontally beneath the roll-axis, a work-engaging roll rotatable upon the arm about a substantially vertical axis located in a plane with said horizontal axis thereby to bring said rolls into work-gripping and feeding relation, means arranged to vary the angular relation of the axis of the last-mentioned roll with respect to the axis of the first-mentioned roll, and means for supplying a coating substance to the work.

16. In a coating machine, a conical applying roll, means for delivering cement thereto, a conical pressure-roll co-operating with the applying roll, the axes of the rolls, when extended from the large ends of the cones, being divergent, means for rotating the rolls, and a work-gage co-operating with the rolls adjacent the large ends from which the axes diverge.

17. In a cementing machine, a conical applying roll rotatable about a substantially horizontal axis, means for delivering cement to the applying roll, a conical work-supporting roll rotatable about a substantially vertical axis, means for rotating the rolls, a table extending along the surface of the work-supporting roll adjacent to the base, and a gage extending substantially at right angles to the table.

18. In a cementing machine, a conical applying roll rotatable about a substantially horizontal axis, means for delivering cement to the applying roll, a conical work-supporting roll rotatable about a substantially vertical axis, means for rotating the rolls, a table extending adjacent to the base of the work-supporting roll, a gage extending substantially at right angles to the table, and a mounting arranged to adjust the table and gage together.

19. In a coating machine, a conical applying roll, a conical pressure-roll co-operating with the applying roll, the axes of the rolls extended beyond the bases of the cones being divergent, means for rotating the rolls, a conical cement-delivering roll co-operating with the applying roll and rotatable about an axis substantially parallel to that of said applying roll, and a gage positioned adjacent to the bite of the rolls and the base of one roll.

20. In a machine for cementing substantially flat curved heel-portions, a conical applying roll, means for delivering cement thereto, a conical work-supporting roll cooperating with said applying roll to grip a heel portion therebetween, the length of the conical surfaces between the apices and bases being less than the radii of curvature of the heel-portions, resilient means urging said rolls into engagement with the work, and means for rotating the applying and work-supporting rolls.

21. In a coating machine, a cement-trough, a conical supplying roll rotatable in the trough, a conical applying roll, a conical delivering roll interposed between the supplying and applying rolls, all of said rolls being rotatable about substantially parallel axes, and a work-supporting roll co-operating with the applying roll to grip a piece of work and rotatable about an axis diverging from that of said applying roll.

22. In a cementing machine, a rotatable cement-applying roll, means for delivering cement thereto, a pivoted arm extending substantially parallel to the axis of the applying roll, a bearing member pivoted upon the arm, a work-supporting roll rotatable in the bearing member, and a connection between the arm and bearing member arranged to vary the angular position of the work-supporting roll.

23. In a cementing machine, a conical cement-applying roll rotatable about a substantially horizontal axis, means for delivering cement to the applying roll, a substantially horizontal pivoted arm, a bearing member pivoted upon the arm, a conical work-supporting roll rotatable in the bearing member about a substantially vertical axis, and adjusting connections between the arm and bearing member.

24. In a cementing machine, a conical cement-applying roll rotatable about a substantially horizontal axis, means for delivering cement to the applying roll, a substantially horizontal pivoted arm, a bearing member pivoted upon the arm, a conical work-supporting roll rotatable in the bearing member about a substantially vertical axis, said work-supporting roll being provided with a cement-deflecting flange about its base, and adjusting connections between the arm and bearing member.

25. In a cementing machine, a frame, a shaft rotatable therein, a cement-applying roll carried by the shaft, means for delivering cement to the applying roll, an arm pivoted upon the frame, a shaft journaled in the arm, a bearing member pivoted upon the arm, means for fixing the bearing member in different positions, two shafts journaled in the bearing member, a work-supporting roll carried by one of said shafts, universal connections between the other bearing-shaft and the arm-shaft, gearing connecting the bearing-shafts, and gearing connecting the applying-roll-shaft and the arm-shaft.

26. In a coating machine, co-operating rotatable work-engaging and gripping members for feeding pieces of work, means for delivering a coating substance for application to the work, and an ejecting member on the machine positioned to abut and interfere with the progress of a piece of work as it is advanced by the engaging members and cooperating with said members to eject a piece of work from the machine.

27. In a coating machine, opposed conical work-engaging and advancing rolls adapted to feed the work in a path lying in a plane, and an ejecting member on said machine projecting normally into the plane of the path of feed and into contact with which a part of the work comes as it is advanced by the rolls thereby interrupting the normal movement of one portion of the work and setting up with the advancing rolls a rotative action which throws the work out of the machine.

28. In a coating machine, co-operating rotatable work-gripping and feeding members to advance pieces of work, and an ejecting member positioned normally in the plane of pieces of work gripped by the feeding members and into contact with which the work is advanced by the feeding members, said ejecting member being mounted to yield to permit the passage of work as it is introduced to the feeding members.

29. In a coating machine, co-operating rotatable work-engaging members for feeding pieces of work and tending to keep each piece passing through the members, means for delivering a coating substance for application to the work, and an ejecting member for engagement with a characteristic feature upon each piece of work during its normal progress, said ejecting member being situated at the rear of the engaging members.

30. In a machine for coating work-portions having a curved edge and an edge connecting the extremities of the curved edge, a conical applying roll, means for delivering a coating substance thereto, a conical pressure-roll co-operating with the applying roll, means for rotating the rolls, and an ejecting member contacting with the connecting edge-portion of the work upon the completion of the coating of the margin at the curved edge.

31. In a coating machine, co-operating rotatable work-engaging rolls gripping opposite faces of a piece of work to feed it, and a work-ejecting finger yieldably mounted adjacent to the rolls in position to engage a piece of work and to oppose the feeding action of the rolls whereby the work is thrown out of the machine upon continued feeding movement of the rolls.

32. In a coating machine, co-operating rotatable work-engaging rolls, means for delivering a coating substance for application to the work, and a work-ejecting finger at the rear of the rolls and provided with a work-engaging end situated above the rolls.

33. In a coating machine, co-operating rotatable work-engaging rolls, means for delivering a coating substance to one of the rolls, a work-ejecting finger at the rear of the rolls and provided with a work-engaging end situated above the rolls, and means for adjusting the finger toward and from the rolls.

34. In a coating machine, co-operating rotatable work-engaging rolls, means for delivering a coating substance to one of the rolls, and a work-ejecting finger freely pivoted adjacent to the rolls and having at one extremity a work-receiving recess and at the opposite extremity a weight.

35. In a machine for coating the curved margins of heel-portions, a conical cement-applying roll, a co-operating conical work-supporting roll, means for rotating the rolls, and an ejecting member positioned on the machine for engagement with the breast-edges of the heel-portions as they are moved into contact therewith by said co-operating rolls.

36. In a machine for coating the curved margins of heel-portions, a conical cement-applying roll, a co-operating conical work-supporting roll, means for rotating the rolls, and a pivoted finger provided with a recessed end arranged to engage the breasts of the heel-portions.

37. In a machine for coating the curved margins of heel-portions, a conical cement-applying roll, a co-operating conical work-supporting roll, means for rotating the rolls, a standard mounted for adjustment toward and from the rolls, and an ejecting member pivoted upon the standard and arranged for engagement with the breast-edges of the heel-portions.

38. In a cementing machine, a conical applying roll, a conical work supporting roll, said applying roll being rotatable about a substantially horizontal axis and said work supporting roll being rotatable about a substantially upright axis to grip a piece of work between the conical surfaces of said rolls, means for rotating the rolls, means for delivering cement to the applying roll, a table positioned adjacent to the base of the work supporting roll, and an upright gage member associated with the surface of the table for contact with the edge of a piece of work positioned on the table for delivery to the bite of said rolls.

CAROLINE E. COSGROVE,
*Administratrix of the Estate of John W. Cosgrove, Deceased.*